March 18, 1952     M. D. TIEGEL     2,589,645
INSULATING AND HEATING JACKET FOR FOOD CONTAINERS
Filed July 23, 1948
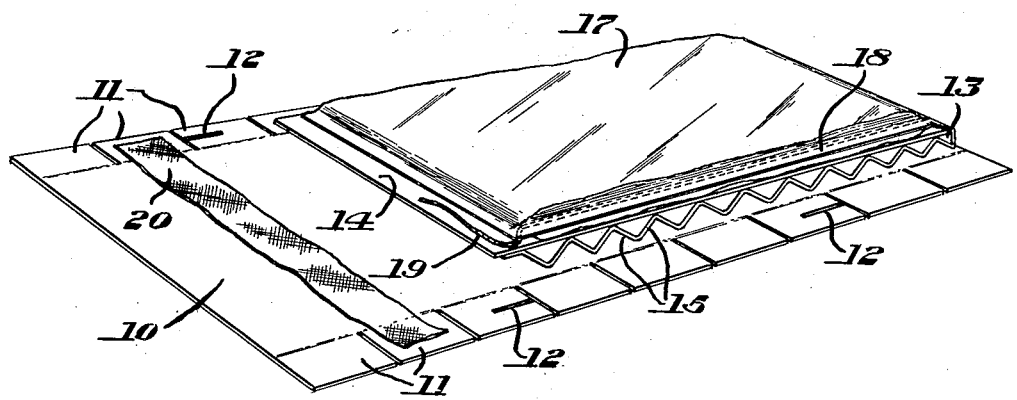
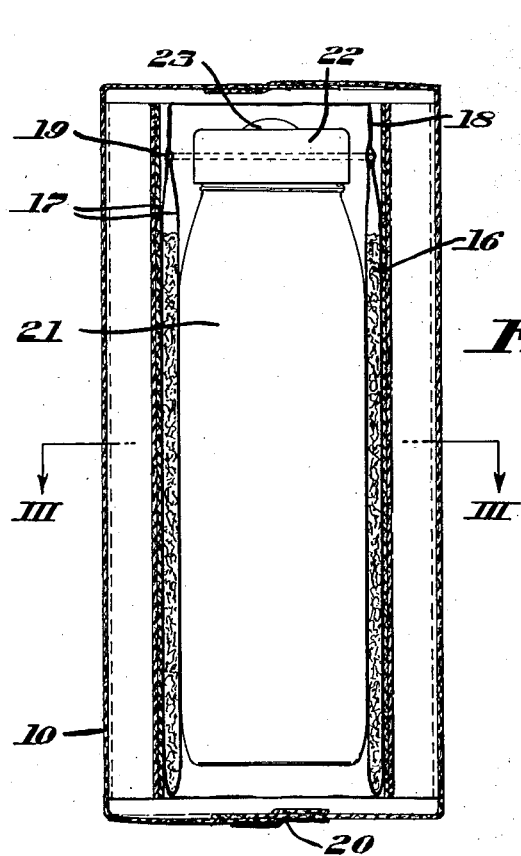
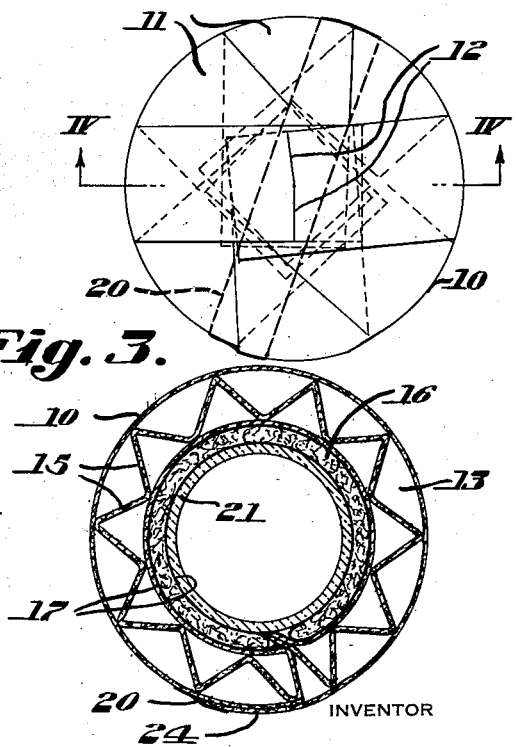
INVENTOR
MARGARET D. TIEGEL Patented Mar. 18, 1952

2,589,645

UNITED STATES PATENT OFFICE 2,589,645

INSULATING AND HEATING JACKET FOR FOOD CONTAINERS

Margaret D. Tiegel, Greensburg, Pa.

Application July 23, 1948, Serial No. 40,326

7 Claims. (Cl. 126—263)

This invention relates to an insulating and heating jacket for food containers. More particularly, it relates to jackets for bottles or cans, the contents of which are to be kept cold and then heated or warmed before use.

Household refrigerating and heating appliances are used in a home for the purpose of chilling and subsequently heating food containers such as a nursing bottle filled with a dietary formula for an infant. However, whenever a household is traveling or away on vacation, or attending picnics and other occasions away from home, such appliances are not available. At such times other means must be sought in order to maintain such a food in a container at a safe temperature before heating it to the desired degree before use.

In the jacket of this invention, a fibrous layer assists in maintaining food in a container at such a safe temperature for a reasonable period during travel or other absence from home or home conveniences. The same layer also has contained within it means for heating the food in the container when it is wanted. An impregnant in powdered or other form is used with the fibrous layer for such purpose and it can be selected from a variety which are well known as having an exothermic effect upon being moistened with a liquid, usually water. Moreover, it is possible to select such an impregnant which will heat through a relatively narrow temperature range to minimize any risk of overheating the contents. Further, some impregnants leave no liquid residue which both makes the use thereof simple and avoids any hazard which might be present with a liquid.

In a preferred embodiment of this invention, a moistureproof enclosure is used with the fibrous layer and completely envelopes it. This enclosure has means to permit it to be readily opened for the moistening of the fibrous layer and serves to keep any such moisture away from the remainder of the jacket. A spacing layer of air cells is also provided which both assists in maintaining a food container such as a nursing bottle in its prechilled condition and also assists in preventing the flow of heat generated after the fibrous layer is moistened from affecting the exterior of the jacket. The food container is usually placed within the interior of the container immediately adjacent the fibrous layer.

In that preferred embodiment, the jacket is made in assembled flat, but unrolled, form for ease of packaging and for tight rolling about the food container to insure that the fibrous layer is held close to the container. If a flexible material such as cardboard is used for an outer container and the spacing layer, and cotton in a moistureproof envelope is used for the fibrous material layer, a jacket is obtained which is economical, light, strong and easily disposed of after use.

Other objects and advantages of this invention will appear from the further consideration of this specification and the drawings hereto. These drawings illustrate, on a reduced scale, a preferred embodiment, in which Figure 1 is a perspective view of a jacket of this invention in flat form as it comes from the package;

Figure 2 is a plan view of the jacket after it has been rolled into its final assembled shape and closed over a food container therein;

Figure 3 is a horizontal sectional view through the final assemblage shown in Figure 2, the section being taken at the level of line III—III in Figure 4; and Figure 4 is a vertical sectional view taken along line IV—IV of Figure 2.

Referring to the drawings, 10 is a flat strip of a suitable flexible material such as 10-ply cardboard. Along the edges of strip 10 are tabs 11, preferably scored along the folding line of each thereof, used in closing the jacket. Certain of the tabs 11 are partly slotted or cut to provide notches 12 which interlock at the respective ends in the final assemblage of the jacket, as shown in Figure 2.

A spacing layer 13 is positioned on strip 10 and extends from the edge at one end thereof most of the length of the strip and substantially between the tab folding lines. This layer is made, in the embodiment shown, of a single piece of the same flexible cardboard material. This material forms a surface 14 spaced from the strip 10, both in the flat and in the rolled positions, which spacing is determined by the height of the corrugations 15 between said surface 14 and the strip 10. These corrugations are substantially in the form of equilateral triangles and constitute a series of air spaces or air cells serving an insulating function in the assembled jacket. In addition, the corrugations 15 add structural strength to the jacket of this invention. The spacing of the corrugations and the distance between surface 14 and strip 10 can easily be predetermined with reference to the insulating service to be performed.

A fibrous layer 16 is superposed upon the surface 14 and is generally coextensive therewith in area. Each layer is suitably attached to the contiguous parts of the jacket by a suitable glue or other adhesive or by mechanical means such as stapling. This fibrous layer 16 made of a suitable material such as cotton, is enveloped in a moistureproof cellophane or other moistureproof plastic enclosure 17 made either of separate sheets or of a folded single sheet, the edges of which are crimped or sealed shut around the fibrous layer as by pressure heating. The single sheet of cellophane shown in Figure 4 needs only to be sealed at the sides and across the top 18 thereof. In order to allow for the ready opening of the moistureproof envelope 17 to permit easy moistening of the fibrous layer 16, a rip string 19 is provided. This rip string is positioned between the sides of the top closure of the envelope 17 at the time of the sealing thereof, as shown in Figure 4. Completing the jacket assembly in its flat position is a strip 20 of sealing tape removably affixed at one end as by the adhesive thereon to the flat strip 10. The strip of sealing tape is preferably long enough to close the side seam of the jacket when rolled, and to extend across the bottom closure of the jacket.

It is evident that the dimensions of the strip 10, the surface 14 and the fibrous layer 16 with its envelope 17 is chosen and may be widely varied to suit the sizes and types of food containers to be accommodated. In the embodiment shown, the jacket is particularly suitable for use with a popular make of infant's nursing bottle. Other sizes can be made for tin or glass containers of other foods such as puddings, soups and even for non-food containers which require maintenance of a chilled condition followed by subsequent heating.

When the jacket shown in the drawings is rolled with the flat strip 10 forming the outer container, and spacing layer 13 and fibrous layer 16 being respectively concentric therewith and with each other, an axial receptacle or passage is provided which more or less exactly accommodates the size and dimensions of a nursing bottle 21 having a cap 22 and disc closure 23 therewith. Moreover, when the jacket is rolled and closed, the fibrous layer 16 is held closely adjacent to and surrounds the sides of the bottle 21. The height of the assembled jacket is such that there is adequate clearance to permit the closure and locking of the tabs 11 at both ends. Should it ever be desirable to exactly center the nursing bottle axially of the jacket, between the top and bottom closures thereof, circular fiber or paper washers which are not shown, may easily be inserted under and on top of the bottle within the center passage occupied by the bottle. The jacket of this invention is also designed to accommodate reasonable variations in the diameter of the food containers to be serviced in that in the rolling of the jacket into substantially cylindrical form, allowance can be made for any such variation in diameter.

The jacket is prepared for use and used in the following manner. A package of the assembled but unrolled jackets is opened and one of the jackets is withdrawn. Then rolling is commenced at the edge of the flat strip 19 in alignment with the superposed edges of spacing layer 13 and fibrous layer 16, and continued about an axis substantially parallel to the length of the corrugations 15. In rolling the central or axial passage developed should just fit the food container to be placed therein, the food container can be used as a guide if the user does not know from experience exactly how tight the rolling should be. When the free end of flat strip 10, above which there are no other layers, laps over as shown at 24 in Figure 3 the rolling is complete and the rolled jacket is in substantially cylindrical form. Concentric spacing layer 13 thus lines the outer container 10 and concentric fibrous layer 16 lines the spacing layer 13 so that a food container when placed therein is substantially surrounded by such layers. After rolling, the bottom tabs are closed and interlocked, and the strip of sealing tape 20 which was removed earlier, is applied by the adhesive thereon along the longitudinal side seam of the rolled jacket and across the bottom to assist in maintaining the closure of the jacket.

At this juncture, a food container such as nursing bottle 21, filled with an infant's food formula previously chilled in the refrigerator, is placed in the axial passage surrounded by fibrous layer 16 and its moistureproof enclosure 17 following which the tabs at the top of the rolled jacket are closed and interlocked. Where it is desirable, additional time for the maintenance of the contents of bottle 21 at a safe temperature can be obtained by placing the rolled jacket in a refrigerator until the air spaces or cells formed by the corrugations 15 in the spacing layer 13 are also chilled. When so done, a prechilled nursing bottle of infant's formula will remain below a detrimental temperature for as long as from 18 to 24 hours. When the formula is needed, the tabs at the top of the jacket are opened, the rip string 19 is pulled and a small quantity of water is added to the fibrous layer 16. Since this layer is impregnated, for example, with a mixture of lye (sodium or potassium hydroxide) and baking soda, in the respective proportions of 1 to 2, approximately 4 ounces of water added to the lye and soda will generate a temperature between about 102° and 108° F. for a period which may run as long as an hour, which is much longer than usually needed to properly heat the formula in bottle 21. Without intending to be confined thereto, it is believed that the soda simply modifies the total heating effect caused by adding water to the lye in the fibrous layer 16. Such a temperature cannot seriously overheat the bottle, if at all, and another advantage is that the residue of the heating action is a solid. In any event, the moistureproof enclosure 17 prevents any moisture from passing to the other parts of the jacket. The heat generated in the fibrous layer 16 is not readily transmitted to the outer container 10 of the rolled jacket because of the spacing layer 13. After use, the jacket may be disposed of without difficulty.

Although I have illustrated and described but a preferred embodiment, it will be clear that changes in the construction and arrangement of various parts may be made without departing from the spirit of the invention or the scope of the appended claims.

I claim:

1. An insulating and heating device of the character described, comprising, a flat strip of flexible material adapted to form an outer container when rolled into substantially cylindrical form, a spacing layer superposed on said flat strip, a layer of fibrous material superposed upon said spacing layer, said spacing layer and layer of fibrous material being adapted to be rolled when said flat strip is rolled, said layer of fibrous material also having materials adapted to liberate heat upon being moistened, and means for closing said outer container when said flat strip is rolled, whereby a chilled food container placed within said outer container and said layers is insulated against detrimental loss of heat for a predetermined period and is then heated when said layer of fibrous material is moistened.

2. An insulating and heating device of the character described, comprising, a flat strip of flexible material adapted to form an outer container when rolled into substantially cylindrical form, a layer of insulating material superposed on said flat strip, a layer of fibrous material superposed on said insulating layer and adapted to be rolled therewith, said layer of fibrous material having an impregnant therein adapted to liberate heat upon being moistened, a moistureproof enclosure enveloping said layer of fibrous material, means for making an opening in said moistureproof enclosure, and means for closing said outer container when rolled into substantially cylindrical form, whereby a food container within said outer container and said layers in substantially cylindrical form will be insulated and then will be heated when an opening is made in said moistureproof enclosure and said layer is moistened.

3. An insulating and heating device of the character described, comprising, a flat strip of flexible material adapted to form an outer container when rolled into substantially cylindrical form, said flat strip having tabs along at least one edge thereof to close said outer container when said flat strip is so rolled, a layer of insulating material superposed upon said flat strip, a layer of fibrous material superposed upon said insulating layer and adapted to form an inner layer when rolled therewith, said layer of fibrous material also having materials adapted to liberate heat upon being moistened, and sealing means adapted to hold said outer container after it is formed, whereby a food container in said outer container and said layer of fibrous material and in close proximity to said layer of fibrous material will be insulated while said layer is dry and then will be heated when said layer is moistened.

4. An insulating and heating device of the character described, comprising, a flat strip of flexible material, a strip of flexible insulating material spaced from said flat strip, a strip of material folded to contact alternately each of said first two strips along their lengths and thereby keep them spaced from each other, and a moistureproof envelope adjacent said second strip and containing fibrous material impregnated with materials which give off heat when moistened, the whole assembly being adapted to be rolled into a hollow cylinder into which a food container can be placed and kept insulated from external sources of heat and which will supply heat to the container when the impregnants for the fibrous material are moistened.

5. An insulating and heating device as described in claim 4 in which a rip cord is provided to facilitate opening of the moistureproof envelope when it is desired to add water to the fibrous material in the envelope.

6. An insulating and heating device as described in claim 4 in which the impregnants for the fibrous material are lye and baking soda in the proportion of one part of lye to two parts of soda.

7. An insulating and heating device as described in claim 4 having an adhesive tape partially secured to the first mentioned flexible strip, which tape can be removed and used for holding the device after it has been rolled into cylindrical form.

MARGARET D. TIEGEL.

REFERENCES CITED

The following references are of record in the file of this patent:

UNITED STATES PATENTS

| Number | Name | Date |
|---|---|---|
| 485,098 | Forshew | Oct. 25, 1892 |
| 858,848 | Allison | July 2, 1907 |
| 901,334 | Flipse | Oct. 20, 1908 |
| 1,588,123 | Maston | June 8, 1926 |
| 2,051,063 | Winkel | Aug. 18, 1936 |
| 2,157,169 | Foster | May 9, 1939 |
| 2,168,219 | Lakenbach | Aug. 1, 1939 |
| 2,185,799 | Blake et al. | Jan. 2, 1940 |
| 2,355,739 | McCabe | Aug. 15, 1944 |
| 2,384,720 | Babcock et al. | Sept. 11, 1945 |

FOREIGN PATENTS

| Number | Country | Date |
|---|---|---|
| 16,822 | Great Britain | of 1904 |
| 308,773 | Italy | June 14, 1933 |
| 495,217 | Great Britain | Sept. 23, 1938 |